United States Patent [19]
Rüsseler et al.

[11] Patent Number: 5,066,776
[45] Date of Patent: Nov. 19, 1991

[54] PROCESS FOR THE MANUFACTURE OF POLYARYLENE SULPHIDES

[75] Inventors: Wolfgang Rüsseler; Karsten-Josef Idel; Ernst-Ulrich Dorf; Wolfgang Alewelt; Dieter Freitag, all of Krefeld, Fed. Rep. of Germany

[73] Assignee: Bayer Aktiengesellschaft, Leverkusen, Fed. Rep. of Germany

[21] Appl. No.: 565,729

[22] Filed: Aug. 13, 1990

[30] Foreign Application Priority Data

Aug. 24, 1989 [DE] Fed. Rep. of Germany ....... 3927929

[51] Int. Cl.$^5$ .............................................. C08G 75/16
[52] U.S. Cl. .................................... 528/388; 528/381
[58] Field of Search ................................. 528/381, 388

[56] References Cited

U.S. PATENT DOCUMENTS

| | | | |
|---|---|---|---|
| 4,912,180 | 3/1990 | Dorf et al. | 528/388 |
| 4,935,473 | 6/1990 | Fukuda et al. | 528/388 |
| 4,960,861 | 10/1990 | Kotera et al. | 528/388 |

Primary Examiner—Morton Foelak
Attorney, Agent, or Firm—Connolly and Hutz

[57] ABSTRACT

The invention concerns a process for the manufcture of polyarylene sulphides from alkali sulphide and aromatic dihalogen compounds, whereby the alkali sulphide is produced in situ.

5 Claims, No Drawings

PROCESS FOR THE MANUFACTURE OF POLYARYLENE SULPHIDES

The invention concerns a simplified process for the manufacture of polyarylene sulphides from alkali sulphide and aromatic dihalogen compounds, whereby the alkali sulphide is produced in situ.

Polyarylene sulphides and processes for their manufacture are known, e.g. U.S. Pat. Nos. 3,354,129, 3,919,177, EP-A 39 508, EP-A 73 525, EP-A 73 526, EP-A 86 487, EP-A 166 368, DE-A 25 24 471, EP-A 226 909, EP-A 226 998, EP-A 240 016, DE-A 37 25 997, EP-A 272 903, EP-A 302 218, EP-A 306 025. Among other things, these are reactions under high pressure. Constructional and process technology problems are already known, e.g. those associated with handling corrosive media under pressure and at high temperatures. Further specific drawbacks arise from the process variations such as multi-stage reaction, the use of considerable amounts of excipients, possible hydrolysis of aromatic dihalogen products by reaction mixtures containing water, corrosion, etc. This can lead to too low a molecular weight and defective quality of the product.

Simplified processes not using pressure are known from EP-A 126 369, EP-A 142 024, EP-A 171 021, EP-A 215 259. These are multi-step processes (EP-A 126 369, EP-A 215 259) whereby the metering of corrosive media with suitable reservoir reactors and metering devices (e.g. EP-A 142 024, EP-A 171 021, EP-A 215 259) can be technically onerous.

Single-reactor reactions (process performed in one reactor) for the manufacture of polyarylene sulphides with comparatively little technical effort are known from EP-A 109 637 but do not proceed satisfactorily in all respects.

The purpose of the invention is therefore to develop another improved, technically simple process for the manufacture of polyarylene sulphides, preferably polyphenylene sulphide. The process according to the invention presents advantages over known processes, e.g. largely avoiding hydrolysis of aromatic dihalogen compounds by shortening the contact time, largely avoiding the formation of foam during dewatering and during the reaction, improved yield per unit space and time and thus reduced energy consumption, no use of excipients, improved product quality, less strain on the circulation system for recovering solvents and washing liquid.

The object of the invention is a process for the manufacture of polyarylene sulphides from a) the same or different dihalogen-(hetero)aromatic compounds, preferably aromatic dihalogen compounds of formulae (I), (II) and/or (III)

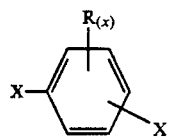
(I)

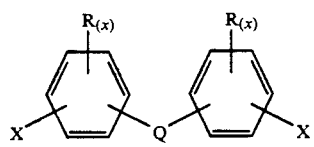
(II)

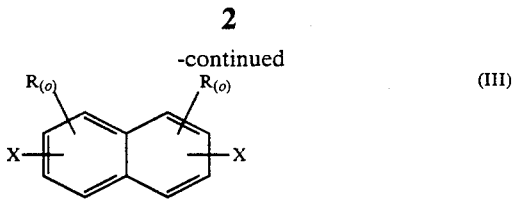
(III)

wherein

X signifies halogen such as chlorine or bromine, $R^1$ is the same or different and may be hydrogen, $C_1$–$C_4$ alkyl, $C_5$–$C_{10}$ cycloalkyl, $C_6$–$C_{10}$ aryl, $C_7$–$C_{14}$ alkylaryl, $C_7$–$C_{14}$ arylalkyl, whereby two $R^1$ residues in the ortho position may, with the involvement of the neighbouring C atoms in the ring, together be coupled to form a $C_5$–$C_{14}$ aromatic residue or a heterocyclic ring containing up to three heteroatoms such as N, O and S, and Q stands for a single bond or a group such as —$CR^1_2$—, —Ar—, —O—, —S—, —$NR^1$—, —C(O)—, —C(O)—Ar—C(O)—, —C(O)—$NR^1$—C(O)—, whereby $R^1$ has the meaning stated above and Ar stands for a $C_6$–$C_{24}$ aromatic or heteroaromatic residue, and x stands for the numbers 1, 2, 3 or 4, o stands for the numbers 1, 2 or 3, whereby up to 20 mol % of the aromatic dihalogen residues may be replaced if necessary by $C_1$–$C_{36}$ aliphatic dihalogen residues and/or $C_8$–$C_{36}$ aromatic residues containing at least two aliphatically bound halogens, and b) if required, 0.05 to 3 mol %, relative to the sum of a), tri- or tetrahalogen aromatic residues of formula (IV)

$$ArX_n \qquad (IV)$$

wherein

X stands for halogen such as chlorine or bromine,

Ar stands for $C_6$–$C_{24}$ aromatic residue or heteroaromatic residue in which up to 3 C atoms may be replaced by heteroatoms such as N, O or S, and n stands for the number 3 or 4, and/or if required, 0.05 to 7.5 mol %, relative to the sum of a), of compounds for regulating the molecular weight, preferably monohalogen or monohydroxy aromatic compounds, and c) alkali sulphides prepared in situ from alkali hydroxide and hydrogen sulphide, preferably sodium or potassium sulphide or mixtures thereof, if required together with alkali hydrogen sulphides d) in a polar, aprotic organic solvent, characterized in that i) a 1.8- to 2.4-fold molar amount, relative to the sum of aromatic dihalogen compounds in a), of alkali hydroxide, preferably sodium or potassium hydroxide, is placed in the reactor with the polar solvent at room temperature and normal pressure or slightly elevated pressure up to 10 bar, and ii) then, if required with simultaneous heating, a 0.9- to 1.2-fold molar amount, relative to the sum of aromatic dihalogen compounds in a), of gaseous or condensed hydrogen sulphide is introduced, and iii) then or at the same time, is heated to a temperature of at least 150° C., and iv) then the aromatic dihalogen compound(s) of a) are added, and v) then, by azeotropic distillation with the aid of the aromatic dihalogen compound(s) at a minimum temperature corresponding to the boiling point of the water-containing azeotrope, the water is separated in a period of 5-100 minutes, and vi) the temperature is continuously increased to 230°-250° C., whereby the start of the temperature rise lies in (v) or follows it, and this temperature is maintained over a specified period of time.

The addition of hydrogen sulphide occurs in a period from 1 minute to 4 hours that is sufficient to achieve complete reaction with the alkali hydroxide.

Sodium and/or potassium hydroxide may be used as the alkali hydroxide.

The time period in (vi) is from 1 hour to 48 hours.

If required, the reaction is performed under an inert gas (e.g. $N_2$).

The reaction time can be varied within a broad range. It may be from less than 1 hour to several days, preferably from 1 hour to 48 hours and particularly preferably from 2 to 18 hours. Unreacted hydrogen sulphide can be removed through the head at any time during polymerization and, for example, may be recycled. Unreacted halogenated aromatic compounds may be separated from the reaction mixture at the end of the reaction, e.g. by distillation.

In a particular embodiment of the invention, multi-reactor cascades going as far as a continuous reaction process may be used. In certain cases it may be advantageous to use apparatus in which all parts coming into contact with the reaction mixture are composed of corrosion-resistant materials or are coated with them, e.g. titanium, zirconium, glass, certain high-grade steels and plastics that are stable under the reaction conditions.

Isolation of the polyarylene sulphides may for example be undertaken in known ways by cooling, filtering and washing the reaction mixture first with ketones such as acetone or alcohols such as methanol, ethanol or isopropanol, or reaction solvent. The remaining residue can then be suspended in water. The suspension obtained in this case is acidified with acids such as acetic, hydrochloric, phosphoric or sulphuric acid, etc., and then washed with water. The polyarylene sulphides obtained in this way are practically free from electrolytes.

Examples of aromatic dihalogen compounds of formulae (I), (II) or (III) which can be used according to the invention include 1,4-dichlorobenzene, 1,4-dibromobenzene, 1-bromo-4-chlorobenzene, 1,3-dichlorobenzene, 1,3-dibromobenzene, 1-bromo-3-chlorobenzene, 2,5-dichlorotoluene, 2,5-dichloroxylene, 1,4-dichloro-2-ethylbenzene, 1,4-dibromo-2-ethylbenzene, 1,4-dichloro-2,3,5,6-tetramethylbenzene, 1,4-dichloro-2-cyclohexylbenzene, 2-benzyl-1,4-dichlorobenzene, 2,4-dichlorotoluene, 2,4-dichloroxylene, 2,4-dichlorocumene, 4,4'-dichlorodiphenyl, 4,4'-dichlorterphenyl, 4,4'-dibromodiphenyl, 3,3'-dichlorodiphenyl, 3,3'-dibromodiphenyl, 2,4'-dichlorodiphenyl, 2,4'-dibromodiphenyl, 1,4-dichloronaphthalene, 1,4-dibromonaphthalene, 1,5-dichloro-naphthalene, 2,6-dichloronaphthalene, 2,6-dibromonaphthalene, 2,7-dichloronaphthalene, 2,7-dibromonaphthalene, 1,8-dichloronaphthalene, 1,8-dibromonaphthalene, 4,4'-dichlorobenzophenone, 4,4'-dichlorodiphenylsulphone, 1,4-bis-(4-chlorobenzoyl)-benzene, bis-4-chlorobenzimide, N-methyl-bis-4-chlorbenzimide, N-phenyl-bis-4-chlorobenzimide, N,N'-bis-(4-chlorobenzoyl)-phenylenediamine, N,N'-diphenyl-N,N'-bis-(4-chlorobenzoyl)-phenylenediamine, etc. 1,4-Dichlorobenzene and 1,3-dichlorobenzene are preferred.

At least 20 mol % of the aromatic dihalogen compound used should be able to form a volatile azeotrope with water, such as 1,4-dichlorobenzene, 1,3-dichlorobenzene, 2,5-dichlorotoluene, 2,5-dichloroxylene, 1,4-dichlor-2-ethylbenzene, etc.

In a particular embodiment of the invention, up to 20 mol % of the aromatic dihalogen compound can be replaced by linear, branched or cyclic (from $C_5$) $C_1$-$C_{36}$ aliphatic dihalogen compounds containing Cl or Br, such as dichloromethane, 1,2-dichloroethane, 1,3-dichloropropane, 1,3-dichlorobutane, 2,3-dichlorobutane, 1,4-dichlorobutane, 1,2-dichlor-2-methylpropane, 1,3-dichlor-2,2-dimethylpropane, 1,5-dichloropentane, 1,6-dichlorohexane, 1,7-dichloroheptane, 1,8-dichloroctane, 1,9-dichlorononane, 1,10-dichlorodecane, 1,11-dichloroundecane, 1,12-dichlorododecane, higher dichloroparaffins, 1,2-dichlorocyclohexane, 1,3-dichlorocyclohexane, 1,4-dichlorocyclohexane, etc., or by $C_8$-$C_{36}$ aromatic compounds which contain at least two aliphatically bound halogens such as Cl or Br, e.g. o-xylylenedichloride, m-xylylenedichloride, p-xylylenedichloride, 1,3-bis-(chloromethyl)-4,6-dimethylbenzene, etc.

Examples of branched compounds of formula (IV) which can be used for the invention are 1,2,4-trichlorobenzene, 1,3,5-trichlorobenzene, 1,3,5-tribromobenzene, 1,35-tris-(4-chlorophenyl)-benzene, 1,3,5-tris-(4-bromophenyl)-benzene, 2,2',4,4'-tetrachlorodiphenyl, 2,2',4,4'-tetrachlorodiphenylsulphide, etc.

Examples of compounds which can be used according to the invention to regulate molecular weight are phenol, thiophenol, their alkali salts (Li, Na, K), bromobenzene, 4-chlorodiphenyl, 4-chlorodiphenylsulphone, 4-chlorodiphenylsulphide, 1-chloronaphthalene, 2-chloronaphthalene, etc.

Examples of polar aprotic solvents which can be used according to the invention are amides such as hexamethylphosphoric acid triamide, N,N-dimethylformamide, sulphones such as diphenylsulphone, lactams such as N-methylpyrrolidone, N-ethylpyrrolidone, N-isopropylpyrrolidone, N-methylpiperidone, N-ethylcaprolactam, heterocycles such as N,N'-dimethylimidazolidinone, N,N'-dimethylpyrimidazolidinone, methyloxophospholane, etc. The boiling point of the solvent should be 200°-280° C. To reach the stated temperature range, the reaction can be performed under slightly increased pressure (up to 10 bar).

Co-solvents may be used, such as N,N-dialkylcarboxamides of $C_1$-$C_8$ aliphatic and $C_6$-$C_{12}$ aromatic carboxylates in an amount from 0.02 to 1.0 mole relative to 1 mole of hydrogen sulphide, e.g. N,N-dimethylacetamide, N,N-diethylacetamide and N,N-dimethylpropionamide.

Usual substances can be used in usual amounts as catalysts, such as sodium or potassium fluoride, phosphate, carboxylate or capronate in amounts from 0.02 to 1.0 mole catalyst per mole of hydrogen sulphide.

The polymers according to the invention have molecular weights $M_n$ of about 1000 to 100,000. Molecular weight is determined for example by a chromatographic method or by molten viscosity measurements (see EP-A 171 021 for example).

A further object of the invention is the use of the polyarylene sulphides manufactured according to the process of the invention, if required in mixtures with usual fillers, strengtheners and excipients and/or polymers to prepare shaped bodies.

Shaped bodies within the meaning of the invention are extrudates such as fibres, films, sheets, tubes, profiles, etc., shaped parts prepared by standard injection moulding procedures or composites obtained by standard processes.

The polyarylene sulphides according to the invention can, if required, be mixed with the usual fillers and strengtheners (e.g. Modern Plastics Encyclopedia 1988, Vol. 64, No. 10A, pages 183–194), the usual excipients (loc. cit. pages 127–178) in the usual amounts (up to about 300 wt %).

The shaped bodies can, if required, also contain other polymers such as (co)polyarylene sulphide, polycondensates, polyadducts, polymerisates, etc.

The polyarylene sulphides manufactured according to the invention can be used as shaped bodies in the usual ways, e.g. as automobile parts, armatures, valves, bearing components, electrical components such as switches, electronic boards, chemical-resistance and weathering-resistant parts and apparatus such as pump housings and pump fans, etching baths, sealing rings and components of office machinery, telecommunications equipment and household appliances.

EXAMPLES

EXAMPLE 1

1726 g of N-methylcaprolactam and 425.6 g of sodium hydroxide are placed under nitrogen in a 4-liter glass reactor fitted with a glass stirrer. 200 g of hydrogen sulphide are then led into the mixture in about 20 minutes with stirring. This is heated to 150° C. in about 15 minutes and then 782 g of 1,4-dichlorobenzene are run in with further heating to 180° C. Dewatering thereby follows in about 10 minutes, whereby the azeotropically distilled 1,4-dichlorobenzene is led back into the reaction vessel. The mixture is then brought to reflux temperature.

After about 10 hours total reaction time, the product is isolated by precipitation in 25 liters of isopropanol, filtration, washing with dilute sulphuric acid, washing with water and drying in a vacuum drying unit. The isopropanol precipitation liquor is almost colourless and the product precipitates as a pure white, fibrous material (534 g=93%).

EXAMPLE 2

Repetition of Example 1

1726 g of N-methylcaprolactam and 425.6 g of sodium hydroxide are placed under nitrogen in a 4-liter glass reactor fitted with a glass stirrer. 200 g of hydrogen sulphide are then led into the mixture in about 15 minutes with stirring. This is heated to 150° C. in about 15 minutes and then 782 g of 1,4-dichlorobenzene are run in with further heating to 180° C. Dewatering thereby follows in about 20 minutes, whereby the azeotropically distilled 1,4-dichlorobenzene is led back into the reaction vessel. The mixture is then brought to reflux temperature.

After about 10 hours total reaction time, the product is isolated by precipitation in 25 liters of isopropanol, filtration, washing with dilute sulphuric acid, washing with water and drying in a vacuum drying unit. The isopropanol precipitation liquor is pale yellowish and the product precipitates as a pure white, fibrous material (528 g=92%).

EXAMPLE 3

3890 g of N-methylcaprolactam and 960 g of sodium hydroxide are placed under nitrogen in a 10-liter reactor with stirrer, column and water separator (all parts coming into contact with the product are of titanium). 450 g of hydrogen sulphide are then led into the mixture in about 30 minutes with stirring. This is heated to 150° C. in about 15 minutes and then 1764 g of 1,4-dichlorobenzene are run in with further heating to 180° C. Dewatering thereby follows in about 25 minutes. The mixture is then brought to reflux temperature.

After about 11 hours total reaction time, the product is isolated by precipitation in 55 liters of isopropanol, filtration, washing with dilute sulphuric acid, washing with water and drying in a vacuum drying unit. The isopropanol precipitation liquor is almost colourless and the product precipitates as a pure white, fibrous material (1218 g=94%).

EXAMPLE 4

2700 g of N-methylcaprolactam and 665 g of sodium hydroxide are placed under nitrogen in a 5-liter V4A reactor with stirrer, column and water separator. 310 g of hydrogen sulphide are then led into the mixture in about 20 minutes with stirring. This is heated to 150° C. in about 15 minutes and then 1223 g of 1,4-dichlorobenzene are run in with further heating to 180° C. Dewatering thereby follows in about 20 minutes. The mixture is then brought to reflux temperature.

After about 11 hours total reaction time, the product is isolated by precipitation in 40 liters of isopropanol, filtration, washing with dilute sulphuric acid, washing with water and drying in a vacuum drying unit. The isopropanol precipitation liquor is yellowish and the product precipitates as a whitish, fibrous material (809 g=90%).

EXAMPLE 5

Comparative example corresponding to Example 1 with commercial alkali sulphide:

1726 g of N-methylcaprolactam, 583.5 g of sodium sulphide hydrate (60% product) and 91.8 g of sodium hydrogen sulphide monohydrate are placed under nitrogen in a 4-liter glass reactor fitted with a stirrer. This is heated to 150° C. in about 30 minutes and then 782 g of 1,4-dichlorobenzene are run in with further heating to 180° C. Dewatering thereby follows in about 45 minutes, whereby the azeotropically distilled 1,4-dichlorobenzene is led back into the reaction vessel. The mixture is then brought to reflux temperature.

After about 11 hours total reaction time, the product is isolated by precipitation in 25 liters of isopropanol, filtration, washing with dilute sulphuric acid, washing with water and drying in a vacuum drying unit. The isopropanol precipitation liquor is brown and the product precipitates as an ochre, fibrous material (517 g=90%).

EXAMPLE 6

A single-vessel variant according to EP-B 109 637 (Example 2) for comparison: (N.b.: for better comparability, the preparation was adapted to that of the examples according to the invention).

1110 g of N-methylcaprolactam, 305.2 g of sodium sulphide hydrate (60% product), 28 g of 50% sodium hydroxide, 341.1 g of 1,4-dichlorobenzene and 38.05 g of sodium acetate are placed under nitrogen in a 2-liter three-necked flask fitted with a thermometer, stirrer and column with distillate separator. The reaction mixture is slowly heated to boiling. Water is removed from the distilling azeotrope, which is composed of water and 1,4-dichlorobenzene, and the 1,4-dichlorobenzene is led back into the reaction vessel. Dewatering is completed after 2 hours. Foam forms during this time, which hinders both the technical execution of distillation and the maintenance of stoichiometry in the heterogeneous reaction mixture. It is heated under reflux for a further 9 hours and the product is isolated by precipitation in 20 liters of isopropanol, filtration, washing with dilute sulphuric acid, washing with water and drying in a vacuum drying unit. The isopropanol precipitation liquor is dark brown and the product precipitates as a whitish, fibrous material (224.7 g=92%).

EXAMPLE 7

A single-vessel variant according to EP-A 171 021 (Example 7 on page 55) for comparison: (N.b.: for better comparability, the preparation was adapted to that of the examples according to the invention).

1110 g of N-methylcaprolactam, 323.5 g of sodium sulphide hydrate (60% product), 2.4 g of 50% sodium hydroxide, 341.1 g of 1,4-dichlorobenzene, 38.05 g of sodium acetate and 4.44 g of e-caprolactam are placed under nitrogen in a 2-liter three-necked flask fitted with a thermometer, stirrer and column with distillate separator. The reaction mixture is slowly heated to boiling. Water is removed from the distilling azeotrope, which is composed of water and 1,4-dichlorobenzene, and the 1,4-dichlorobenzene is led back into the reaction vessel. Dewatering is completed after 2 hours. Foam forms during this time, which hinders both the technical execution of distillation and the maintenance of stoichiometry in the heterogeneous reaction mixture. It is heated under reflux for a further 9 hours and the product is isolated by precipitation in 20 liters of isopropanol, filtration, washing with dilute sulphuric acid, washing with water and drying in a vacuum drying unit. The isopropanol precipitation liquor is dark brown and the product precipitates as a whitish, fibrous material (234.7 g=94%).

EXAMPLE 8

A metered variant according to EP-A 171 021 (Example 8 on page 55) for comparison:

1110 g of N-methylcaprolactam and 341.1 g of 1,4-dichlorobenzene are placed under nitrogen in a 2-liter three-necked flask fitted with a thermometer, stirrer, coolable column, distillate separator and reflux condenser, and the mixture is heated to 190°-200° C. To this is added a solution of 323.5 g of sodium sulphide hydrate (60% product), 2.4 g of 50% sodium hydroxide, 38.05 g of sodium acetate and 29.4 g of e-caprolactam in a total of 250 ml water (including water of hydration), added dropwise in such a way that the added water can be distilled azeotropically with the 1,4-dichlorobenzene. The 1,4-dichlorobenzene is thereby led back into the reaction vessel. Much foam forms during this time, which hinders both the technical execution of distillation and the maintenance of stoichiometry in the heterogeneous reaction mixture. After the end of addition and dewatering (about 4 hours), it is heated under reflux for a further 10 hours and the product is isolated by precipitation in 20 liters of isopropanol, filtration, washing with dilute sulphuric acid, washing with water and drying in a vacuum drying unit. The isopropanol precipitation liquor is brown to dark brown and the product precipitates as a whitish, fibrous material (230.37 g=90%).

TABLE

Summary of Experiments 1-8

| Example | Reaction additive | Total time | Water/DCB contact time | Foam formation | Colour of: liquor | Colour of: product | Other comments |
|---|---|---|---|---|---|---|---|
| According to the invention: | | | | | | | |
| 1 | no | 10 h | 10' | no | nearly colourless | white | |
| 2 | no | 10 h | 20' | no | pale yellow | white | |
| 3 | no | 11 h | 25' | no | nearly colourless | white | |
| 4 | no | 11 h | 20' | no | yellowish | white | No corrosion layer in the reactor |
| Outside the invention: | | | | | | | |
| 5 | no | 11 h | 45' | yes | brown | ochre | Baking on heating, low molecular weight product |
| 6 | yes | 11 h | 2 h | yes | dark brown | whitish | |
| 7 | yes | 11 h | 2 h | yes | dark brown | whitish | |
| 8 | yes | 14 h | 4 h | yes | brown | whitish | |

N.b.: The products of experiments 1-4 and 6-8 were of high molecular weight and could be used as thermoplastics.

What we claim is:

1. A process for the manufacture of polyarylene sulphides from
   a) dihalogen-(hetero)aromatic compounds of formulate (I), (II) or (III)

(I)

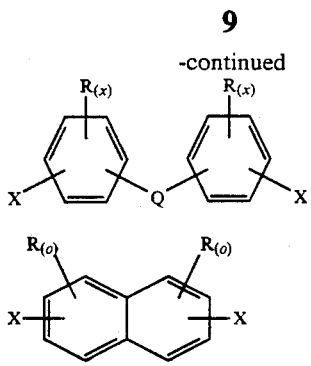

(II)

(III)

wherein

X signifies halogen, $R^1$ is hydrogen, $C_1$-$C_4$ alkyl, $C_5$-$C_{10}$ cycloalkyl, $C_6$-$C_{10}$ aryl, $C_7$-$C_{14}$ alkylaryl, $C_7$-$C_{14}$ arylalkyl, or two $R^1$ residues together in the ortho position together with the adjacent carbon atoms in the ring form a $C_5$-$C_{14}$ aromatic residue with or without up to three heteroatoms comprising N, O or S, Q stands for a single bond or —$CR^1_2$—, —Ar—, —O—, —S—, —$NR^1$—, —C(O)—, —C(O)—Ar—C(O)—, —C(O)—$NR^1$—C(O)—, whereby $R^1$ has the meaning stated above and Ar stands for a $C_6$-$C_{24}$ aromatic with or without a N, O or S heteroatom, x stands for the numbers 1, 2, 3 or 4, o stands for the numbers 1, 2 or 3, whereby up to 20 mol % of the aromatic dihalogen residues are optionally replaced by $C_1$-$C_{36}$ aliphatic dihalogen residues or $C_8$-$C_{36}$ aromatic residues containing at least two aliphatically bound halogens, b) optionally 0.05 to 3 mol %, relative to the sum of a), of tri- or tetrahalogen aromatic residues of formula (IV)

$ArX_n$ (IV)

wherein

X stands for halogen,

Ar stands for $C_6$-$C_{24}$ aromatic residue with or without up to 3 carbon atoms replaced by heteroatoms comprising O or S, and n stands for the number 3 or 4, and optionally, 0.05 to 7.5 mol %, relative to the sum of a), of compounds for regulating the molecular weight, c) alkali sulphides prepared in situ from alkali hydroxide and hydrogen sulphide, optionally with alkali hydrogen sulphides, d) in a polar, aprotic organic solvent, characterized in that i) a 1.8 to 2.4 molar amount, relative to the sum of aromatic dihalogen compounds in a), of alkali hydroxide is placed in a reactor with the polar solvent at room temperature and normal pressure or elevated pressure up to 10 bar, and ii) optionally, with simultaneous heating, a 0.9 to 1.2 molar amount, relative to the sum of aromatic dihalogen compounds in a), of gaseous or condensed hydrogen sulphide is introduced, and iii) heated to a temperature of at least 150° C., iv) the aromatic dihalogen compound(s) of a) are added, and v) by azeotropic distillation the pressure of the aromatic dihalogen compounds at a minimum temperature corresponding to the boiling point of the water-containing azeotrope, water is separated in a period of 5-100 minutes, and vi) the temperature is continuously increased to 230°-250° C.

2. A process according to claim 1 wherein the alkali hydroxide is sodium hydroxide.

3. A process according to claim 1 wherein the polar solvent is N-methylcaprolactam, N,N'-dimethyl pyrimidazolidinone.

4. A process according to claim 1 wherein compounds for regulating the molecular weight in b) are aromatic monohalogen or monohydroxy compounds.

5. A process according to claim 1 wherein the alkali sulphides prepared in situ are sodium sulphide, potassium sulphide or both.

* * * * *